Patented Jan. 21, 1936

2,028,172

UNITED STATES PATENT OFFICE 2,028,172

ART OF IRRIGATING AND FERTILIZING PLANTS

William Oscar Sweek, Phoenix, Ariz., assignor of one-fifth to William Thomas McGeorge, Tucson, Ariz., one-fifth to Julius S. Benroth, Phoenix, Ariz., one-fifth to James A. Saunders, Washington, D. C., and one-fifth to Herbert H. Porter, Clarendon, Va.

No Drawing. Application June 22, 1934, Serial No. 731,972

18 Claims. (Cl. 47—58)

This invention relates to improvements in the art of irrigating and fertilizing soils for plant husbandry, and more particularly concerns an inexpensive and controllable method of selective fertilization during the course of normal irrigation.

While the invention is adapted broadly to the art of irrigating and fertilizing, it is of especial benefit in alkali sections, where both the soil itself and irrigating water are of alkaline nature. It has long been known that the irrigation of alkali soils does not produce continuously a high state of plant husbandry, as the soils appear to "go back" to non-productive condition. Since many plants are not highly tolerant to alkali soils, it is advantageous to use acid fertilizers with such soils, but no simple, cheap, and effective manner of employing such fertilizers is in common use. Furthermore, most plants require nitrogen for their active development, but this use of nitrogen must be apportioned to the particular plant, and preferably only utilized during certain stages of the plant growth. Where it is sought to use natural or artificial nitrates or other forms of fixed nitrogen, there must be added to the original expense of the nitrogen, the cost of bringing the nitrogen into an easily transportable (usually solid) form, and the cost of transporting and distributing this material upon the soil. Furthermore, it is estimated that three-quarters of such nitrogen is lost to the plant, as nitrates are easily soluble and hence are leached out and lost from effective value to the plant. Furthermore, it is customary to employ the nitrogen fertilizer by distributing it all at one time, or in a limited number of successive applications. Hence, the application may be excessive, and the excess operates deleteriously to a proper ripening of the plant; or else the quantity is too small and the plant does not receive an adequate degree of fertilization.

The present invention proposes the utilization of fixed nitrogen in the irrigating water itself, without the passage of the nitrogen through a solid form with the concomitant costs of shipment and distribution, and particularly proposes the utilization of the nitrogen in the form of acids which neutralize the excess alkalinity of the soils and of the irrigating water itself in a continuous manner, so that the aforesaid retrogression of the soils does not occur, and so that even plants of low alkali tolerance may be cultivated upon such soils.

A further feature of the present invention is that it is especially applicable, and with but little additional expense, to the ordinary conditions of irrigation, where a storage dam is employed not only for detaining water for irrigating purposes but also for the development of power by hydro-electric means for service in the community. Since this power is often present in excess of the requirements of the local community, even at on-peak loads, it is possible to employ the water of irrigation, itself, for the production, by its energy, of the fertilizing ingredient which is incorporated with it, so that a part of the energy of such water is employed for producing the fixed nitrogen, at the storage dam for example, and then another part of the energy of this water is employed for moving the water to the field where it is to be used. The water, charged with nitrogen gases, can be passed through the usual flumes and ditches, and this passage may be employed effectively for continuing the oxidizing of the nitrogen gases to the form of nitric acid.

A preferred method of practicing the invention, in supplying irrigation and fertilization to a soil of alkaline nature, is therefore that of utilizing electricity produced from the energy of the water to operate arc devices for treating air to produce nitrogen oxides therefrom. These oxides are then introduced into the water, preferably prior to the passage of the water through the turbine in order to attain a thorough mixture and absorption of the gases by the water, followed by the movement of the water through flumes and ditches to the field to be treated. The usual method of irrigation comprises admitting irrigating water to the various fields at different times, on schedule, and hence it is possible to treat the different fields with different proportions of nitrogen in the water, and to discontinue this charging of the water for a particular field at a time when the introduction of nitrogen should be terminated. The preferred dosage of nitrogen to the soil of a field is, therefore, that which will be absorbed by the plants of the field in the period between successive fertilizing treatments.

In such alkali sections, the soils themselves are alkaline, and the waters contain calcium, magnesium, sodium, potassium, etc., in the form of carbonates and bicarbonates. The nitrogen fixed from air by the electric arcs comprises various oxides including nitrous and nitric anhydrides. These dissolve in the water and form the corresponding acids and/or react directly with the alkalis in the water to form the corresponding nitrites and nitrates and thus fix the gases during the course of the movement of the water to the field. The presence of oxygen in the water, or the contact of further air therewith, as in the outfall of a turbine, causes a rapid oxidation of the nitrites to nitrates; and hence any possible toxicity arising from the presence of nitrites is eliminated by the time the water reaches the field.

The use of the nitrogen in the form of nitrate is advantageous, as most plants absorb nitrogen in this form, and bacterial decomposition must occur before such other forms of nitrogen are available.

It has been found that the use of such charged water causes grains such as wheat to germinate much more rapidly than with uncharged water. The charged water may contain 364 parts per million of nitrogen in the form of nitrates, during the germination period. When wheat was planted, seeds being irrigated with water charged with 90 parts per million of nitrogen in the form of nitrates, the stalks were 4 inches high, at the time the control, irrigated with tap water, was barely breaking through the soil.

The charged water is also of high value with fruit and shade trees. The Chinese elm is highly susceptible to root rot. A tree treated with 5 gallons of water containing 364 parts of nitrogen, in the form of nitrates, per million was poured around the roots of one tree; and 5 gallons containing 90 parts were utilized every 4 days thereafter. The foliage of the treated tree became a dark green, and new leaves came out rapidly. The control and untreated trees have failed to keep pace in growth and their leaves are much paler. Trees planted and cultivated under untreated conditions, in the same kind of soil, died of root rot within two years.

The use of the charged water leads to at least a 30% better growth of wheat than the uncharged water.

As with any use of nitrogen, which is a fertilizer tending to increase the body and foliage growth of plants, it is desirable to continue the use up to the point at which the crop has attained sufficient vegetative growth to produce its fruit or seed; and then be discontinued or substantially reduced. The use of too much nitrogen, and too prolonged a treatment therewith delays maturity, seed production and fruit. An orange grove, for example, requires nitrated water up until blossom time. After the blossoms have opened, the amount of nitrogen should be reduced substantially or entirely withdrawn in order to get the greatest production.

In operating with field soils of alkaline nature, for growing wheat, about 50 parts per million are required; for alfalfa, 100 parts; orange trees, 20 parts; oats, 20 to 60 parts, while shade trees can apparently use an unlimited amount. Obviously, the proper dosing can be determined by observing the condition of growth of the particular plant. By flooding different sections of an irrigated area at different times with water charged to different amounts, a proper dosage for the particular crop is easily attained. An experienced agricultural chemist can determine the alkalinity of the water, and of the soil, and the amount of nitrogen required by the soil. The proper charging of the water is then determinable by mathematical computation, for particular crops. It should be noted however that the continued acidifying of the water prevents increased alkalinity of the soil, and indeed appears to reduce the alkalinity in a field. Hence, the dosage may be decreased from time to time with given fields and a general rotation of crops.

The dosage in the charged water may be regulated by modifying the number of arcs employed for preparing nitrogen gases for a given volume of flow of water.

As the water moves through ditches or flumes, the nitrites and nitrous acid are converted to nitrates and nitric acid. It is preferred especially in alkaline soils to have an excess of acidity in the water, in order to counteract the alkalinity of the soil itself. This excess acid, however, does not evaporate from the water as the concentration does not present a sufficiently high evaporation pressure. Any nitrates taken up by the soil of the ditches merely pass to the adjacent fields, or are leached out again by the next flow of water. Since the nitrates are so highly soluble, there is no tendency to deposit at the low concentrations employed.

It is preferred in fixing the nitrogen of the air, as aforesaid, to employ electric arcs, and to pass the arc gases through chambers or absorption towers so that a change in the constitution of the gas by oxidation and absorption occurs, resulting in the great increase of acid delivered to the water being charged. If the gases are passed through a series of chambers for a proper period of time, so that an optimum oxidation occurs, a maximum quantity of soluble nitrogen matter is produced. However, the use of chambers of too large capacity, so that the arc gases are delayed for too long a time, leads to an over-aging of the gases, and the quantity is not raised to so high a level. The solution of the nitrogen oxides in the water, further, leads to a chemical reaction in which a lower oxide (apparently nitric oxide) occurs as a product. This in turn is again oxidized and again contacted with water, in the absorption towers, to produce a further quantity of dissolved nitrogen matter, etc. Hence, by controlling the volumes of the discharge chambers, and the time required for the arc gases to reach the water being charged, an optimum condition of acidity may be produced in the water.

The invention may be widely used, for the introduction of a desired and regulated quantity of available nitrogen to the plants at appropriate and controlled stages of their growth; and for correcting alkaline conditions of particular soils. Hence, it may be employed in many ways within the scope of the appended claims.

It is customary to utilize say fifty pounds of nitrogen per acre, by reason of losses. However, the cost of this nitrogen, and the labor of applying it to the soil is from $28.00 to $40.00 per acre on western irrigation projects. With the present procedure, as a comparison, it is possible to completely fertilize a similar acre of soil, under accurately controlled conditions of dosage and time, for less than $1.00.

The present invention therefore is further particularly adaptable for consuming waste current, that is, current which can be produced in an electrical supply system in excess of prevailing demand, as during times of off-peak loading. This waste current can be employed for producing the nitrogen oxides by the electric arc, and these oxides dissolved in water, and the solution containing nitrogenous matters stored for a suitable length of time. The solution is then distributed from time to time to the plants as needed thereby. If the water is charged in excess of the required acidity or nitrogen content, under any of the above conditions, the charged water can be diluted with uncharged water to reduce the nitrogen content and acidity to the desired value.

When operating with plants in alkaline soils, it is preferred to utilize the solution with acid reaction.

It will be comprehended that such employment of nitrogen gases may be utilized under various and preferably controlled conditions for establishing a desired pH value in the water as it passes to the plants, in accordance to the demands of the plants both for nitrogen as fertilizer and for a particular optimum pH concentration for the given plant and for the given stage of its growth, and for the given soil in which this growth is occurring. Further, the word "soil" is employed herein as denoting the substrate in contact with which a vegetative plant growth is occurring; and the word "plant" is inclusive of vegetative growths in general, although the above examples have illustratively referred to the culture of trees, shrubs, root crops, grains, and other seed crops.

I claim:

1. The method of irrigating alkaline soils which comprises storing water at a level above the soil to be irrigated, employing a part of the energy of the stored water to generate electricity, employing the electricity to produce nitrogen oxides, absorbing the nitrogen oxides into a part of the water, and moving the charged water to the soil by another part of the energy thereof.

2. The method of irrigating and fertilizing plants in soils which are deficient in acidity and nitrogen, which comprises repeatedly irrigating the soils with water, introducing a predetermined proportion of nitrogen oxides into the water before it is contacted with the soil, and ceasing such introduction when the plants begin to ripen.

3. The method of growing fruiting and seeding plants on alkaline soils by the use of irrigating water of alkaline nature, which comprises irrigating the plants, introducing nitrogen oxides into the water during the initial growth of the plant and in excess of the quantity for neutralizing the water, and discontinuing the introduction of such oxides when the fruits and seed begin to ripen.

4. The method of irrigating and fertilizing soils which comprises storing water at a level above the soil to be irrigated, employing a part of the energy of the stored water in a turbine to generate electricity, employing the electricity to produce nitrogen oxides, absorbing the nitrogen oxides into the water immediately prior to its passage through the turbine so that the water movements in the turbine and outfall assist the mingling of the water and oxides and so that the turbulence in the outfall brings oxygen from the air into contact with dissolved nitrous acid and nitrites for oxidizing them, and moving the water to the soil by another part of the energy thereof.

5. The method of irrigating and fertilizing soils which comprises producing a mixture of nitrogen oxides, passing the oxides into water, and employing the water after such treatment for irrigating the soil, and including the step of causing turbulence in the treated water on its way to the soil for increasing the surface thereof presented to the oxygen in the air in order to accelerate the oxidation of nitrous acid and nitrites therein.

6. The method of cultivating plants having varying demands for nitrogen and varying tolerance to alkalinity, by an irrigation system, which comprises employing the irrigating water from time to time for irrigating the plants, and charging the irrigating water prior to its passage to the plants with nitrogen oxide gases, and including the step of selectively charging the water until it is acid and according to the demands and tolerance of the plants being irrigated.

7. The method of cultivating plants having varying demands for nitrogen and varying tolerance to alkalinity, by an irrigation system, which comprises employing irrigating water from time to time for irrigating the plants, selectively charging the irrigating water prior to its passage to the plants with nitrogen oxide gases to a predetermined dosage for producing an optimum acidity and nitrogen concentration, and repeating the irrigation with charged water at a time interval equivalent to the acceptance of the nitrogen by the plants.

8. The method of cultivating plants having varying demands for nitrogen and varying tolerance to alkalinity, by an irrigation system, which comprises employing irrigating water from time to time for irrigating the plants, charging the irrigating water prior to its passage to the plants with nitrogen oxide gases to dosages which vary from time to time, and selectively controlling the passage of the water to the plants according to the dosage in the water and the demands and tolerance of the particular plants.

9. The method of fertilizing soils which are under irrigation, which comprises storing water at a level above the soil to be irrigated, employing a part of the energy of the stored water to generate electricity, employing the electricity to produce combined-nitrogen gases, contacting the said gases with a part of the water, and moving the charged water to the soil by another part of the energy thereof.

10. The method of fertilizing soils which are under irrigation, which comprises storing water at a level above the soil to be irrigated, employing a part of the energy of the stored water to generate electricity, employing the electricity to produce nitrogen oxides, contacting the nitrogen oxides with a part of the water and accomplishing the oxidation and absorption of the oxides into the water, and moving the charged water to the soil by another part of the energy thereof.

11. The method of irrigating and fertilizing soils which are deficient in acidity and nitrogen, which comprises storing water above the soil to be irrigated, employing a part of the energy of the stored water to generate electricity, employing the electricity to produce nitrogen oxides, employing a part of the stored water for irrigating the soil, and from time to time introducing said nitrogen oxides into the water before it is contacted with the soil.

12. The method of irrigating and fertilizing soils which are deficient in acidity and nitrogen, which comprises storing water at a level above the soil to be irrigated, employing a part of the energy of the stored water to generate electricity, employing the electricity to produce nitrogen oxides, irrigating the soils with a part of said water, and introducing a predetermined proportion of the nitrogen oxides into the irrigating water before it is contacted with the soil to be fertilized.

13. The method of irrigating and fertilizing plants in soils which are deficient in acidity and nitrogen, which comprises storing water at a level above the soil to be irrigated, employing a part of the energy of the stored water to generate electricity, employing the electricity to produce nitrogen oxides, introducing a predetermined proportion of nitrogen oxides into a part of the water, moving the charged water to the soil by the energy stored therein, and ceasing such introduction when the plants begin to ripen.

14. The method of irrigating and fertilizing plants, which comprises storing water at a level above the plants to be irrigated, employing a part of the energy of the stored water to generate electricity for general distribution, producing nitrogen oxides by said electricity at a time of off-peak loading of the electrical supply system, dissolving the oxides in water to form a solution containing nitrogenous matters and storing the solution, and thereafter passing the solution to the plants by another part of the energy of said water.

15. The method of irrigating and fertilizing plants, which comprises storing water at a level above the soil of the plants to be irrigated, employing the energy of the stored water to generate electricity for general distribution, producing nitrogen oxides by said electricity at a time of off-peak loading of the electrical supply system, dissolving the nitrogen oxides into a part of the water, and passing said part of the stored water to the soil.

16. The method of irrigating and fertilizing plants, which comprises storing water at a level above the soil of the plants to be irrigated, employing the energy of the stored water to generate electricity for general distribution, producing nitrogen oxides by said electricity at a time of off-peak loading of the electrical supply system, dissolving the nitrogen oxides into a part of the water to produce nitric and nitrous acid radicles therein, exposing the charged water to the air for effecting oxidation of the nitrous acid radicles, and passing said part of the stored water to the soil.

17. An irrigating and fertilizing medium of acid reaction comprising originally natural alkaline water having nitrogen oxides dissolved therein until the water has an acid reaction.

18. An irrigating and fertilizing medium for use with alkaline soils, comprising originally natural alkaline water containing dissolved nitrogen oxides in quantity in excess of that for neutralizing the natural alkali of the water.

WILLIAM OSCAR SWEEK.